United States Patent [19]

Mayo

[11] 4,346,838

[45] Aug. 31, 1982

[54] TIMED RATE PNEUMATIC CONTROL

[76] Inventor: William L. Mayo, 200 Lake Rd., E. Fork, Hamlin, N.Y. 14464

[21] Appl. No.: 233,874

[22] Filed: Feb. 12, 1981

[51] Int. Cl.³ .......................................... G05D 23/32
[52] U.S. Cl. .................................. 236/46 R; 236/79
[58] Field of Search ............ 62/158; 236/46 R, 46 F, 236/79, 86, 87

[56] References Cited

U.S. PATENT DOCUMENTS

| | | | |
|---|---|---|---|
| 1,540,058 | 6/1925 | Collin | 236/46 X |
| 2,359,651 | 10/1944 | Krogh | 236/79 X |
| 2,562,375 | 7/1951 | Boensod | 236/46 X |
| 3,373,935 | 3/1968 | Thorburn | 236/46 X |
| 3,785,165 | 1/1974 | Valenzuela, Jr. | 62/158 |
| 3,949,936 | 4/1976 | Boyer et al. | 236/46 R X |
| 4,027,171 | 5/1977 | Browder et al. | 236/46 R X |
| 4,243,173 | 1/1981 | Atkinson | 236/46 R |
| 4,248,375 | 2/1981 | Whitney | 236/46 R |

Primary Examiner—William E. Tapolcai, Jr.
Attorney, Agent, or Firm—Stonebraker, Shepard & Stephens

[57] ABSTRACT

A timed rate control applies to a system having a device 12 for varying a medium 14, a sensor 13 for detecting variation in the medium, and a pneumatic line 11 for varying the device 12 in response to the sensor. This includes many pneumatic control systems that the invention can effectively stabilize to reduce fluctuation and improve operating accuracy and efficiency. The pneumatic line is opened and closed by a solenoid valve 17, and a setable timer 18 variably determines both closed and open intervals for the solenoid valve. The timer is connected to the solenoid valve to control alternate operation between the closed and open intervals while the system operates. This limits each adjustment to a brief duration separated by inactive periods that allow the system to stabilize.

14 Claims, 2 Drawing Figures

TIMED RATE PNEUMATIC CONTROL

BACKGROUND

Pneumatic control systems are widely used for holding a variable of a medium approximately to a set point. Many circumstances cause deviation from the set point, however; and pneumatic control systems overshoot, undershoot, and fluctuate as the load and other conditions vary.

Fluctuation in the controlled medium can waste energy and cause many problems so that it would be much better for pneumatic control systems to bring the medium variable quickly to a control point and accurately hold it there. My invention helps achieve this with simple and effective equipment that can be installed easily in both existing and future pneumatic control systems. It can be adjusted to accommodate many different circumstances, it can narrow the required throttling range for the system, and it greatly improves on efficient and accurate operation.

SUMMARY OF THE INVENTION

My timed rate control applies to systems that have a device for varying a medium, a sensor for detecting variation in the medium, and a pneumatic line for varying the device in response to the sensor. It includes a solenoid valve operably arranged for opening and closing the pneumatic line to the varying device and a timer for operating the solenoid valve. The timer is setable for variably determining both a closed interval and an open interval for the solenoid valve, and the timer is connected to the solenoid valve to operate the solenoid valve alternately in the closed and open intervals while the system operates.

This opens the pneumatic line to the pneumatic control system for varying the device at periodic brief intervals and closes the line for the periods between the open intervals to allow the system time to react to the last adjustment and stabilize before the next adjustment occurs. It thus gives the control system a timed rate that can be varied to accommodate systems with different response times and throttling ranges.

This arrangement also produces correcting variations that are roughly proportional to the amount of deviation from the control point. It allows the system to approach the control point in a few gradually diminishing steps and then operate steadily at the control point instead of overshooting and undershooting. It also allows narrowing of the throttling range and finer tuning of the system to work compatibly with changing conditions.

DRAWINGS

FIG. 1 is a schematic diagram of a simple preferred embodiment of my timed rate control; and FIG. 2 is a schematic diagram of a more complex preferred embodiment of my timed rate control.

DETAILED DESCRIPTION

Figure 1:
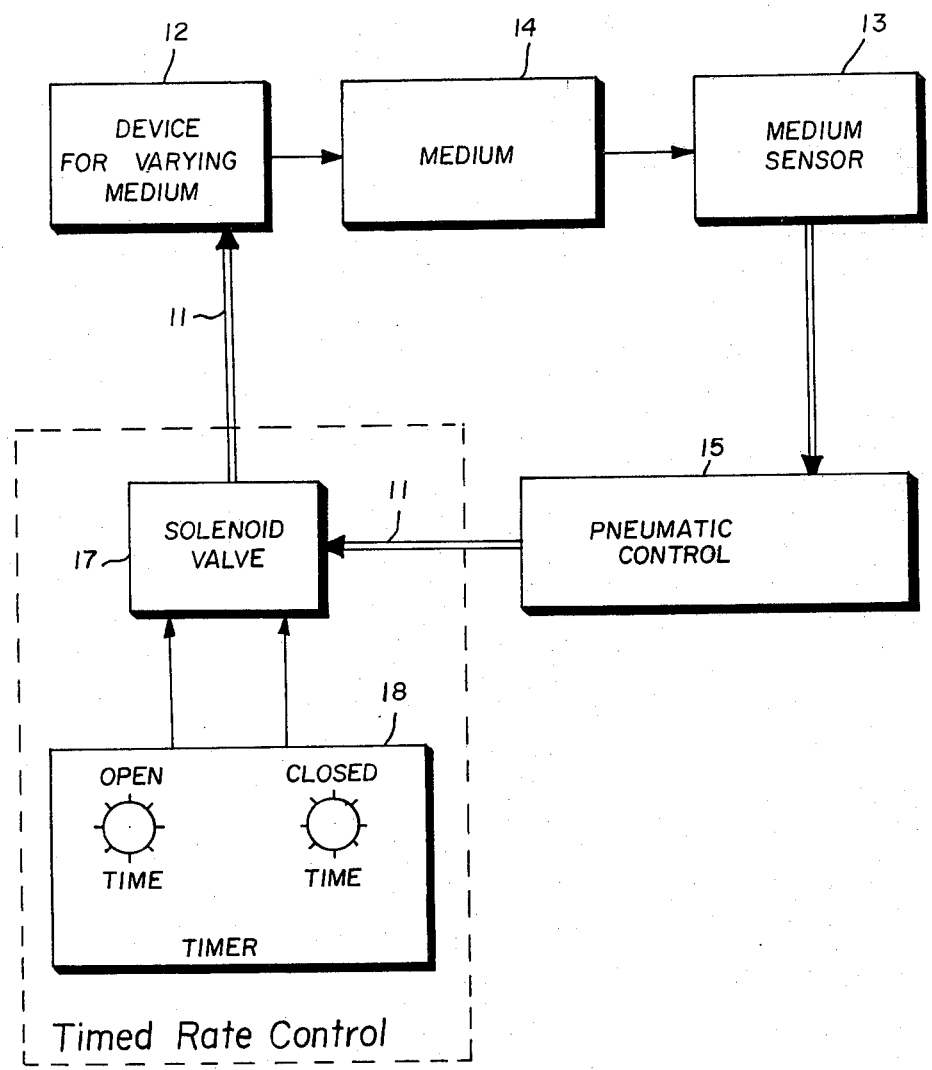

My invention applies to many pneumatic control systems for many different media, including gaseous, liquid, phase-changing, and possibly even solid media. The medium characteristic or variable that is controlled can include temperature, pressure, liquid level, flow rate, humidity, and others. Any such system includes a sensor for sensing the medium characteristic to be controlled and a variable device for varying something that affects this characteristic of the medium in response to the sensor.

The varying device or controlled device is generally an analog or multiposition device, rather than an on/off or two position device. Controlled varying devices suitable for my invention include movable dampers, valves, variable prime movers, and others. This means that practical uses for my invention can be found in systems for heating, air conditioning, cooling, refrigeration, pressure maintenance, temperature control, industrial and manufacturing processes, and many others.

As shown in the drawings, my invention is installed in a pneumatic line 11 for varying a device 12 in response to a sensor 13 for varying a controlled medium 14. The sensor can be mechanical, electrical, optical, or pneumatic; but if non-pneumatic, a transducer 23 transforms the sensor output to a pneumatic signal. Although sensor 13 can pneumatically connect directly to the varying device through pneumatic line 11, typical installations include a pneumatic amplifier 15 receiving pneumatic pressure from a main 16 and amplifying the pneumatic output from the sensor 13 for driving the controlled varying device 12. For such an arrangement, my invention installs in line 11 between pneumatic amplifier 15 and varying device 12.

My invention arranges a solenoid valve 17 for opening and closing pneumatic control line 11 and uses a timer 18 setable for variably determining both the closed interval and the open interval for solenoid valve 17. Timer 18 is connected to operate solenoid valve 17 alternately between closed and open intervals while the system operates.

The pneumatic system operates continuously to apply to the pneumatic control line 11 whatever pressure is responsive to sensor 13. But solenoid valve 17 opens only periodically to let this pressure move through pneumatic line 11 and adjust the varying device 12; and between open intervals, solenoid valve 17 remains closed to block flow in pneumatic line 11 and hold varying device 12 in its previously adjusted position. The closed interval for solenoid valve 17 gives the system time to respond to the last correction of the varying device and register any change in the medium characteristic to the sensor before a subsequent correction occurs. Variation in both the timed intervals for opening and closing the solenoid valve can accommodate different system response times affected by different media, different distances between the varying device and the sensor, different lengths of pneumatic line, and many other variables.

Applying pneumatic control adjustment during brief intervals separated by inactive intervals has several important and beneficial effects. It avoids over correction producing overshoot or undershoot, because each correction occurs after the system has stabilized and is applied in the right direction to move the system toward the control point.

The amount of correction automatically fits the need, because each correction is approximately proportional to the amount of deviation of the controlled characteristic from the control point. For large deviations, the medium sensor 13 produces pressure extremes that create large differences of pressure on opposite sides of solenoid valve 17 in the pneumatic control line 11. This produces more air flow and larger adjustments of varying device 12 to approach the control point quickly when the solenoid valve opens. Conversely, small deviations from the control point produce relatively small pressure differences at the solenoid valve and correspondingly small adjustments in the varying device to bring the system smoothly and accurately to the control point.

My invention allows rapidly approaching the control point with few large adjustment steps, or more slowly approaching the control point with a larger number of smaller adjustment steps, simply by changing the closed and open intervals of the timer 18. Holding the solenoid valve open for longer periods of time causes bigger adjustment steps than briefer openings of the solenoid valve. The closed interval for system stabilization can also vary somewhat to speed up or retard the adjustment process. In most systems, the response time for a change in the varying device 12 to influence the sensor 13 can be measured or estimated, and this response time is preferably used for setting the closed interval for the solenoid valve.

Figure 2:
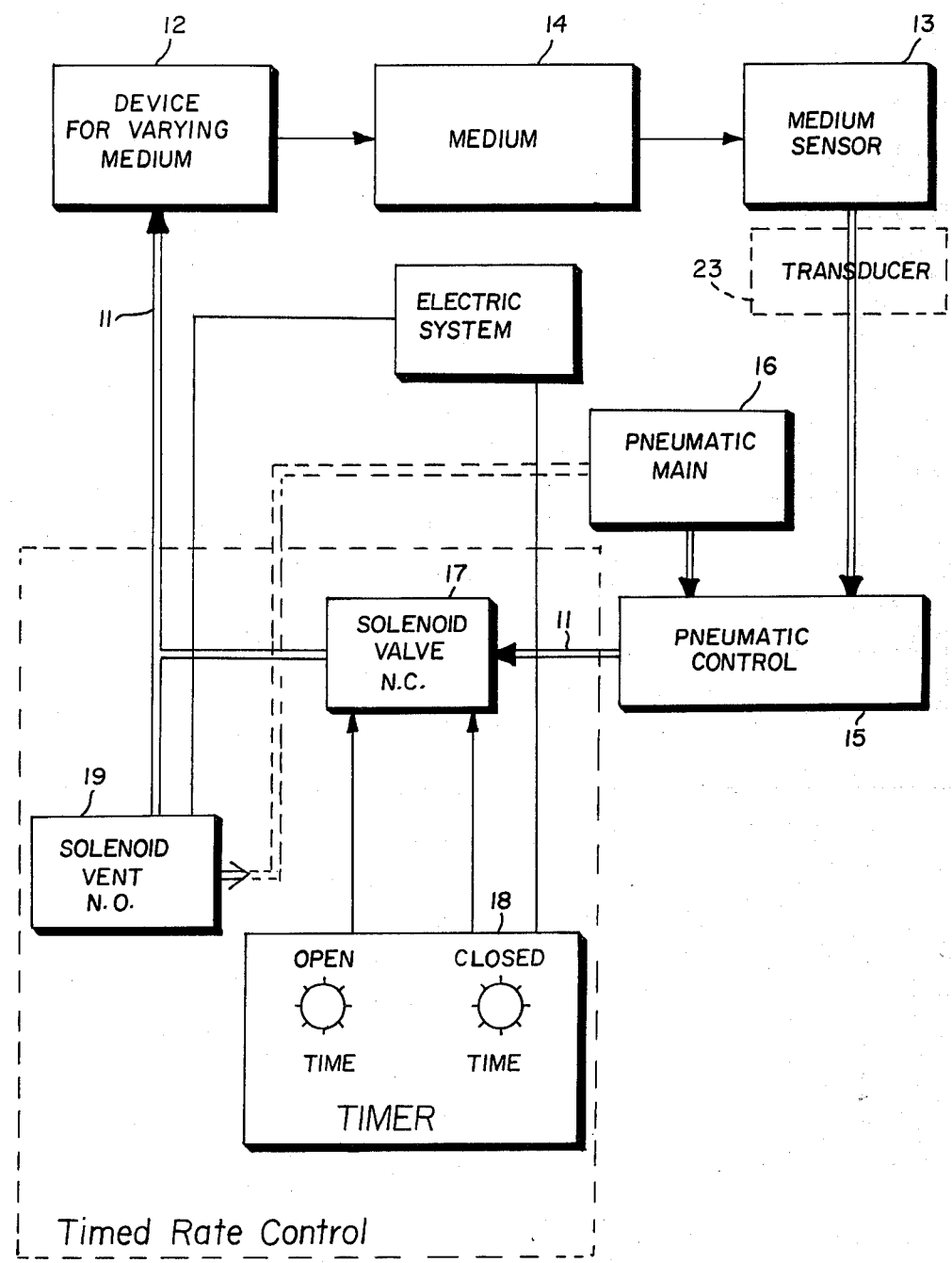

Additional components in the embodiment of FIG. 2 include a solenoid vent valve 19 arranged in pneumatic line 11 between varying device 12 and the timer-controlled solenoid valve 17. The vent valve 19 and the timer 18 are electrically energized whenever the overall system is operating. Vent valve 19 is normally open and opens to vent pneumatic line 11 whenever the system is off and no electric power is supplied. This also shuts off and resets timer 18. Solenoid valve 17 is preferably normally closed and preferably has a toggle mechanism so that it closes pneumatic line 11 against flow in either direction. When not supplied with electric power from timer 18, solenoid valve 17 closes and blocks pneumatic line 11; and when energized by the timer, it opens for the preset interval.

When the system starts up, solenoid vent 19 closes, and timer 18 begins a first cycle that can be either open or closed, depending on the needs of the control system. A level control system, for example, could begin with a valve open cycle, because the sensor would have immediate input on liquid level. In contrast, an air temperature system would preferably start with a closed valve cycle to allow fans to establish air flow and influence the temperature of the sensor before the first correction is applied.

Vent valve 19 can vent pneumatic line 11 to atmosphere or to pneumatic main 16, depending on which pressure extreme should be applied to the varying device when the system is not operating.

Workers skilled in the pneumatic control arts will appreciate the many circumstances that can benefit from the invention to reduce fluctuation, narrow throttling ranges, and bring systems more unerringly to the control point.

I claim:

1. A timed rate control for a system that includes a multiposition device for varying a medium, a sensor and a controller arranged for detecting variation in said medium and applying to said multiposition device a pneumatic pressure that varies as a function of the detected medium variation to adjust the position of said device to alter said medium, and a pneumatic line arranged for transmitting said variable pneumatic pressure from said controller to said multiposition device, said timed rate control comprising:

a. a solenoid valve operably arranged in said pneumatic line between said controller and said device;
   b. said solenoid valve having a closed state blocking transmission of pneumatic pressure from said controller to said device and effectively holding said device in a position determined by pneumatic pressure in said pneumatic line between said device and said closed solenoid valve;
   c. said solenoid valve having an open state opening said pneumatic line to apply said variable pressure from said controller to said device to adjust the position of said device as a function of air pressure from said controller during said open state of said solenoid valve;
   d. a timer setable for variably determining both an interval for said closed state and an interval for said open state of said solenoid valve to establish a timed rate for controlling said multiposition device; and
   e. said timer being connected to said solenoid valve to operate said solenoid valve alternately in said closed state and open state intervals while said system operates to adjust the position of said multiposition device during said open state intervals and to hold an adjusted position of said multiposition device during said closed state intervals.

2. The timed rate control of claim 1 wherein said solenoid valve is normally closed.

3. The timed rate control of claim 1 wherein said closed interval is longer than said open interval.

4. The timed rate control of claim 1 wherein said solenoid valve closes said line against flow in either direction.

5. The timed rate control of claim 1 including a vent in said line between said solenoid valve and said device, and a normally open solenoid vent valve arranged for closing said vent whenever said system is operating.

6. The timed rate control of claim 5 including means for connecting said vent to atmosphere.

7. The timed rate control of claim 5 including a pneumatic main, and means for connecting said vent to said pneumatic main.

8. The timed rate control of claim 1 including electric means for actuating said timer to operate said solenoid valve whenever said system is operating.

9. The timed rate control of claim 8 wherein said solenoid valve closes said line against flow in either direction.

10. The timed rate control of claim 9 including a vent in said line between said solenoid valve and said device, and a normally open solenoid vent valve arranged for closing said vent whenever said system is operating.

11. The timed rate control of claim 10 including means for connecting said vent to atmosphere.

12. The timed rate control of claim 10 including a pneumatic main, and means for connecting said vent to said pneumatic main.

13. The timed rate control of claim 10 wherein said solenoid valve is normally closed.

14. The timed rate control of claim 13 wherein said closed interval is longer than said open interval.

* * * * *